(12) United States Patent
Eglit

(10) Patent No.: US 7,412,017 B2
(45) Date of Patent: *Aug. 12, 2008

(54) METHOD AND APPARATUS FOR RECEPTION OF DATA OVER A TRANSMISSION LINK

(75) Inventor: Alexander Julian Eglit, Half Moon Bay, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/931,962

(22) Filed: Oct. 31, 2007

(65) Prior Publication Data

US 2008/0056421 A1    Mar. 6, 2008

Related U.S. Application Data

(63) Continuation of application No. 11/069,194, filed on Feb. 28, 2005, now Pat. No. 7,292,665.

(51) Int. Cl.
*H04L 7/00* (2006.01)

(52) U.S. Cl. .................................. 375/355; 375/354

(58) Field of Classification Search ................ 375/354, 375/355, 356–376, 316
See application file for complete search history.

(56) References Cited

U.S. PATENT DOCUMENTS

| | | | |
|---|---|---|---|
| 4,468,786 A | 8/1984 | Davis | |
| 4,799,241 A | 1/1989 | Laurent | |
| 5,022,056 A * | 6/1991 | Henderson et al. | 375/373 |
| 5,313,496 A * | 5/1994 | de Goede | 375/342 |
| 5,444,721 A | 8/1995 | Okanoue et al. | |
| 5,533,066 A | 7/1996 | Yamaguchi et al. | |
| 5,648,991 A | 7/1997 | Namekata et al. | |
| 5,838,743 A | 11/1998 | Colineau et al. | |
| 5,930,296 A | 7/1999 | Kot | |
| 5,963,599 A | 10/1999 | Curtis et al. | |
| 6,023,477 A | 2/2000 | Dent | |
| 6,268,848 B1 | 7/2001 | Eglit | |
| 6,430,240 B1 | 8/2002 | Eglit | |
| 6,611,219 B1 * | 8/2003 | Lee et al. | 341/141 |

(Continued)

FOREIGN PATENT DOCUMENTS

DE    28 04 201 A1    8/1979

(Continued)

OTHER PUBLICATIONS

Examination Report dated Nov. 17, 2006 from European Patent Application No. 05257625.3.

(Continued)

*Primary Examiner*—Chieh M. Fan
*Assistant Examiner*—Jason M. Perilla
(74) *Attorney, Agent, or Firm*—Beyer Law Group LLP

(57) ABSTRACT

An over-sampled sequence detector operates on sampled data and tracks the detection reliability of the sampled data. The detector separately analyzes sample sequences for different sampling phases and then picks a sample sequence that allows for the most reliable detection. For the different sampling phases, the detector inspects some amount of look-behind and look-ahead information in order to improve upon simple symbol-by-symbol detection. The over-sampled information is used to further improve detection performance.

21 Claims, 9 Drawing Sheets

U.S. PATENT DOCUMENTS

| | | | |
|---|---|---|---|
| 6,765,975 B2 * | 7/2004 | Dunning et al. | 375/371 |
| 6,959,058 B2 * | 10/2005 | Yoo et al. | 375/355 |
| 7,242,735 B2 * | 7/2007 | Lu et al. | 375/360 |
| 7,317,775 B1 * | 1/2008 | Erhart et al. | 375/355 |
| 7,317,777 B2 * | 1/2008 | Cranford et al. | 375/371 |
| 2002/0150192 A1 | 10/2002 | Chang | |
| 2003/0076905 A1 * | 4/2003 | Schetelig et al. | 375/343 |
| 2003/0215038 A1 | 11/2003 | Hirade et al. | |
| 2004/0066864 A1 * | 4/2004 | Cranford et al. | 375/343 |
| 2004/0210790 A1 * | 10/2004 | Moon et al. | 713/500 |
| 2005/0025191 A1 * | 2/2005 | Vila et al. | 370/503 |

FOREIGN PATENT DOCUMENTS

| | | |
|---|---|---|
| EP | 0 562 183 A1 | 9/1993 |
| EP | 0 639 914 A2 | 2/1995 |
| EP | 1 009 125 A2 | 6/2000 |
| EP | 1 355 443 A1 | 10/2003 |
| WO | WO 03/036853 A1 | 5/2003 |

OTHER PUBLICATIONS

Written Opinion dated May 2, 2006 from Singapore Application No. SG 200507817-5.

Office Action dated Oct. 22, 2007 from corresponding EP Application No. 05 257 625.3.

* cited by examiner

METHOD AND APPARATUS FOR RECEPTION OF DATA OVER A TRANSMISSION LINK

CROSS REFERENCE TO RELATED APPLICATIONS

This patent application is a Continuation of and claims priority to U.S. patent application Ser. No. 11/069,194 filed on Feb. 28, 2005 and entitled "METHOD AND APPARATUS FOR RECEPTION OF DATA OVER DIGITAL TRANSMISSION LINK," which is hereby incorporated by reference herein in its entirety.

FIELD OF INVENTION

The invention pertains in general to data reception over both analog and digital transmission links, and in particular to a receiver that offers robust operation in the presence of deterministic and non-deterministic jitter.

BACKGROUND OF THE INVENTION

High-speed digital communication represents an increasingly important technology. An increasing number of analog communication links are replaced with high-speed serial links offering reliability, link quality (e.g. low Bit Error Rate (BER)), simplicity of use and low cost to end users.

For example, modern computer displays and High-Definition Television (HDTV) displays often employ high-speed serial links based on industry standards such as Digital Visual Interface (DVI) and High Definition Multimedia Interface (HDMI). The aggregate data rate for such links is generally in the Gigabits/second range. For example, the DVI link baud rate approaches 5 Gigabaud, with many vendors offering products exceeding this limit by non-trivial margins.

Another example is a serial Advanced Technology Attachment (ATA) interface for connecting storage devices in computer systems. This application also requires data rates of about 2 Gigabits/second and above.

Still other examples are high-speed Local Area Network (LAN) applications such as Gigabit Ethernet (such as 1000Base-T) as well as emerging 10-Gigabit Ethernet (10GBASE-T) standards.

The links underlying these and similar examples have many common requirements. They require high-speed operation, an ability to tolerate substantial deterministic and/or non-deterministic data jitter, an ability to tolerate substantial frequency offset and/or frequency modulation (FM), good effective BER, an ability to operate with small horizontal eye openings (for example a 0.4 unit interval (UI) eye width specification is not uncommon), high tracking bandwidth, fast phase acquisition and good tracking range, to name a few.

One popular implementation of a receiver for such a high-speed serial link is based on receiver data over-sampling combined with so called 'Phase picking' to select 'good' sample streams. Common DVI link implementations use an over-sampling factor of L=3, and data sampling is often done without any phase tracking. Once the over-sampled data stream is available, the phase picker retains one sample out of L samples by using some type of phase tracking approach (such as transition phase averaging) in order to select the optimal sample.

While such a technique is relatively simple and inexpensive to implement, it suffers from a variety of problems. For instance, some line codes employed today have very wide frequency spectrums (i.e. poor run length (d,k)-constraints). This problem is especially acute for DVI/HDMI links which can have runs from 1 to 14 symbols. For reasons of stability and robustness, phase pickers have to operate with relatively narrow tracking bandwidths. The downside of such an approach is an inability to track deterministic jitter present in the over-sampled data. Narrow tracking bandwidth also places limitations in settling speeds (i.e. phase acquisition times), causes poor transient performance and sometimes narrows the capture range.

One fundamental problem of the phase picking approach is its inability to use all available over-sampled data in the detection process. Common phase picker implementations simply discard L−1 samples for each symbol, retaining just one out of L received samples. Hence, the over-sampled data is used only for phase tracking and not for data detection. Thus, the phase picker discards many data samples which carry useful information about the symbol which is being decoded. In common DVI/HDMI implementations, about ⅔ of the information available to the receiver is simply discarded.

If the data rate is moderate and the eye opening is adequate, such as when the link employs a short high-quality Shielded Twisted Pair (STP) cable, the loss caused by such a phase picking approach is tolerable and makes for an inexpensive receiver implementation. However, once the data rate is increased and/or a longer or lower quality cable is used, such as an Unshielded Twisted Pair (UTP) cable, the available eye width becomes smaller and receiver performance begins to degrade rapidly.

For example, it can be shown that such a traditional phase-averaging phase picker requires an eye opening that is greater than 2 sampling intervals in order to reliably detect data symbols. In case of a common implementation using L=3 samples, this implies that the eye width should be at least 0.7 UI if data errors due to phase picking are to be avoided. Such a limitation is quite acceptable at low speeds and/or short transmission distances, but becomes an expensive luxury at higher data rates and often requires good equalization and pre-emphasis techniques which are relatively expensive.

In addition, many traditional phase picking approaches are difficult to implement at high speeds and/or high over-sampling factors because they generally do not provide an easy way for parallel-processing of the samples. From a receiver implementation standpoint, it is often desirable to have the receiver complexity depend linearly on the over-sampling factor, thus providing for narrower eye specification. Many existing phase picking methods do not exhibit such a linear increase in complexity and instead grow with the square of the over-sampling factor or even more.

An alternative class of receivers well known in the art is represented by so called 'Majority Voting' over-sampled receivers. This technique was widely used in the past for low speed links and offers some linear and/or non-linear filtering of the data, often improving the robustness and BER of the link, provided a good eye opening is available, such as an eye opening of 0.9 UI or wider. Such receivers are also inexpensive to implement, which is an important reason for their popularity in the past. However, once the eye opening begins to shrink, as is common is today's high-speed serial links, the performance of such a 'Majority Voting' receiver quickly becomes unsatisfactory. Furthermore, in general such a receiver has difficulty handling data streams with high frequency offset and frequency modulation, as well as data streams with high non-deterministic jitter.

Compared to traditional 'analog' clock and data recovery (also known as CDR) techniques, data detections and/or phase tracking in the digital domain often have the advantages of portability between different fabrication processes, simple design and low cost. In addition, many non-linear detection and/or filtering methods that might be unavailable for analog implementation are often inexpensive to implement in the digital domain. Furthermore, even though conventional analog CDR often provides good phase tracking performance, it seldom contributes to improved data detection per se; most analog CDRs have a simple sampler for data detection that takes just one sample per symbol. Thus, if substantial eye closure due to high deterministic jitter is present, analog CDR performance becomes unsatisfactory.

In general, the best receiver operation performance may be achieved if every symbol is detected (i.e. sampled) at the point of maximum eye opening height. However, such a sampling point is difficult, and often impossible, to find. In order to determine an 'optimal' sampling point, a receiver usually consults data transitions for guidance. However, such data transitions generally do not occur right at symbol boundaries. Their position is affected by deterministic jitter (caused by inter-symbol interference (ISI) determined by the history of preceding symbols), non-deterministic jitter introduced by noise in various components of the transmission system (such as clock generator phase noise, imprecise slicing of signal by sampler resulting in amplitude and time offsets, additive and multiplicative channel noise, etc.), crosstalk-induced jitter and frequency offset and frequency modulation often present in such a link. In addition, the link often suffers from nonlinear distortions that further complicate reception.

Because the location of transitions may not provide reliable information regarding an optimal sampling point for the current symbol, the receiver may attempt to filter the sampling phase information derived from the observation of the transitions in order to arrive at some acceptable sampling phase. For instance, many existing implementations apply either a linear filter with low-pass transfer characteristics or some nonlinear filter with noise suppression properties (e.g. a median filter). However, the sampling phase position obtained with such a method is often non-optimal in the symbol-by-symbol sense. This is because it is difficult to separate deterministic components (such as ISI and crosstalk) from pure non-deterministic phase noise and frequency offset. While non-deterministic phase noise should be filtered out (i.e. suppressed), the deterministic part as well as the frequency offset should be tracked in order to provide good receiver performance. A filtering approach is often unable to make such a distinction and thus, overall detection performance suffers.

There are other well-known methods that attempt to improve the performance, such as sequence detection method based on the Viterbi Algorithm (VA) and its modifications, as well as feedback detection schemes and Decision Feedback Equalization (DFE). These approaches work well and allow to account for ISI and other deterministic components, thus improving overall performance and simplifying the sampling phase tracking task (since it now only needs to handle non-deterministic parts as well as frequency offsets). However, sequence-detection based methods often are complex and expensive to implement, generally requiring multi-bit sampling (i.e. analog-to-digital conversion (ADC)) and extensive computations on a symbol-by-symbol basis. Once the data rate starts to approach the Gigabit/second range, sequence detectors quickly become impractical. Even at low rates, VD (Viterbi Decoding) and DFE based receivers are prohibitively expensive to implement.

Therefore, what is needed is a simple yet efficient way to build a data receiver with over-sampled data reception which doesn't suffer from the problems which plague traditional phase pickers, 'Majority Voting' and analog CDR receivers.

SUMMARY OF THE INVENTION

An over-sampled sequence detector is disclosed which operates on sampled data. The detector is based upon the novel approach of tracking the detection reliability of the sampled data. The detector separately analyzes sample sequences for different sampling phases and then picks a sample sequence that allows for the most reliable detection. For the different sampling phases, the detector inspects some amount of look-behind and look-ahead information in order to improve upon simple symbol-by-symbol detection. In addition, the over-sampled information is used to further improve the detection performance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to a particular embodiment of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

When over-sampled data is sent over a digital transmission link, it is desirable to use a digital receiver that offers robust operation in the presence of deterministic and non-deterministic jitter. Due to ISI, even though the over-sampled data repeats more than one sample per bit (e.g. 3 times with an exemplary over-sampling factor of L=3), a bit value b may not reach the receiver as a perfectly repeated sample sequence bbb, but may instead comprise values in the sample sequence that are not equal to b. For example, a bit value of 0 may arrive unambiguously as 000, or it may arrive as 001, 100, 101, or any other combination, depending on jitter. Hence, the challenge is to infer the symbol from a number of samples which do not unanimously indicate the symbol.

As noted above, one obvious approach is to use a majority vote of the samples. Unfortunately it does not work in many cases, because it assumes knowledge of symbol boundaries in the transmitted stream of samples, which in itself is a challenge to determine and keep track of. Another approach tracks the phase of the signal by examining transitions and in some instances by implementing a tracking loop. However, phase tracking does not distinguish between phase shifts which result from non-deterministic jitter affecting the ideal sampling position (the position of the sampling clock with respect to the symbol boundary) and therefore should be tracked, and phase shifts which are due to channel memory and do not affect the ideal sampling position and therefore need not be tracked. A variant on phase tracking involves an attempt desensitize the tracking loop to changes in the channel by modifying the bandwidth of the tracking loop, based on the observation that boundary shifting due to ISI is a high-speed process and happens at a rate higher than the bandwidth of the tracking loop. While this approach works well when dealing with low-frequency instabilities, such as problems related to generator frequency or radio link Doppler effects, wide noise spectrums due to cable cross-talk and high-frequency jitters caused by slicers and Phase Lock Loops (PLLs) limit the performance of phase trackers. Therefore, it is desirable to improve the performance of receivers.

Figure 1:
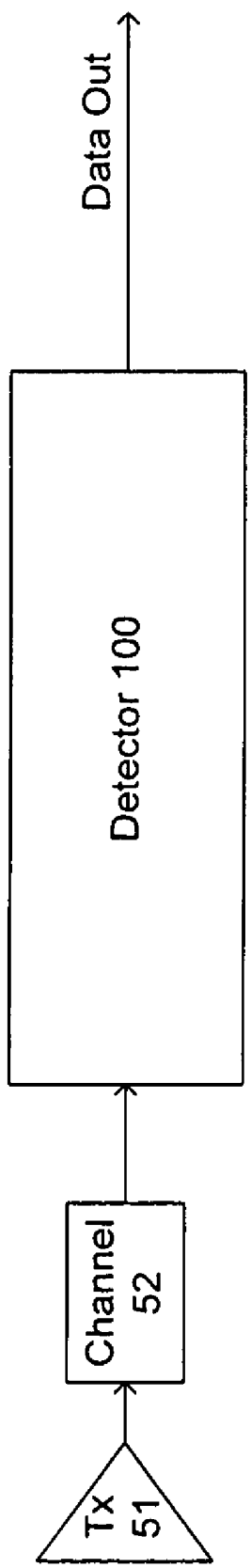
FIG. 1 is a top-level block diagram illustrating a method and system for reception of data over a digital transmission link, in accordance with an embodiment of the present invention.

FIG. 1 is a top-level block diagram illustrating a method and system for reception of data over a digital transmission link, in accordance with an embodiment of the present invention. Transmitter 51 transmits sampled data over channel 52. Over-sampled sequence Detector 100 (hereinafter also referred to as "receiver") receives and decodes the transmitted signal. Detector 100 is based upon tracking the detection reliability of the sampled data, instead of tracking the optimal sampling phase of the data. For simplicity of illustration only and not by way of limitation, one or more exemplary embodiments are disclosed having a link which employs a binary alphabet, wherein each symbol assumes one of two values, such +1 and −1, or 0 and 1. Therefore, one or more embodiments are disclosed to operate at the rate of one bit per sample, and the over-sampling factor is kept low and in many cases can be between 2 and 4 samples. However, these are not necessary conditions for the operation of the disclosed embodiments and the invention is equally applicable to a link with more complex (non-binary) alphabets, and samples comprising more than one bit of information, as well as higher over-sampling factors, can be handled analogously.

By way of example and not by way of limitation, the operation of a detector 100 is shown herein using an over-sampling factor of L=3 and using single-bit sampling. Unlike traditional sequence detectors, the present detector 100 separately analyzes sample sequences for different sampling phases (with a nominal phase offset of 1/L UI) and then picks a sample sequence that allows for the most reliable detection. For the different sampling phases, the detector 100 inspects some amount of look-behind and look-ahead information (i.e. precursor and post-cursor data) in order to improve upon simple symbol-by-symbol detection. In addition, the over-sampled information is used to further improve the detection performance. This is in contrast to conventional 'Phase Pickers' which often discard the over-sampled data once the sampling phase has been decided upon.

In terms of detection performance the present invention is computationally efficient, and therefore can be successfully applied at data rates and/or cost constraints well beyond those currently possible for traditional sequence detectors.

The detection performance can be further improved by combining one or more embodiments of the present invention with transitions-driven phase tracking (analog or digital). For example, phase noise and frequency offset can be reduced by a tracking loop while the ISI and large 'phase hits' can be dealt with by one or more embodiments of the present invention. In effect, slow phase variations as well as non-deterministic phase noise are tracked by the narrow bandwidth feedback loop, while the over-sampled detector 100 of the present invention handles remaining phase deviations (such as ISI).

Figure 2:
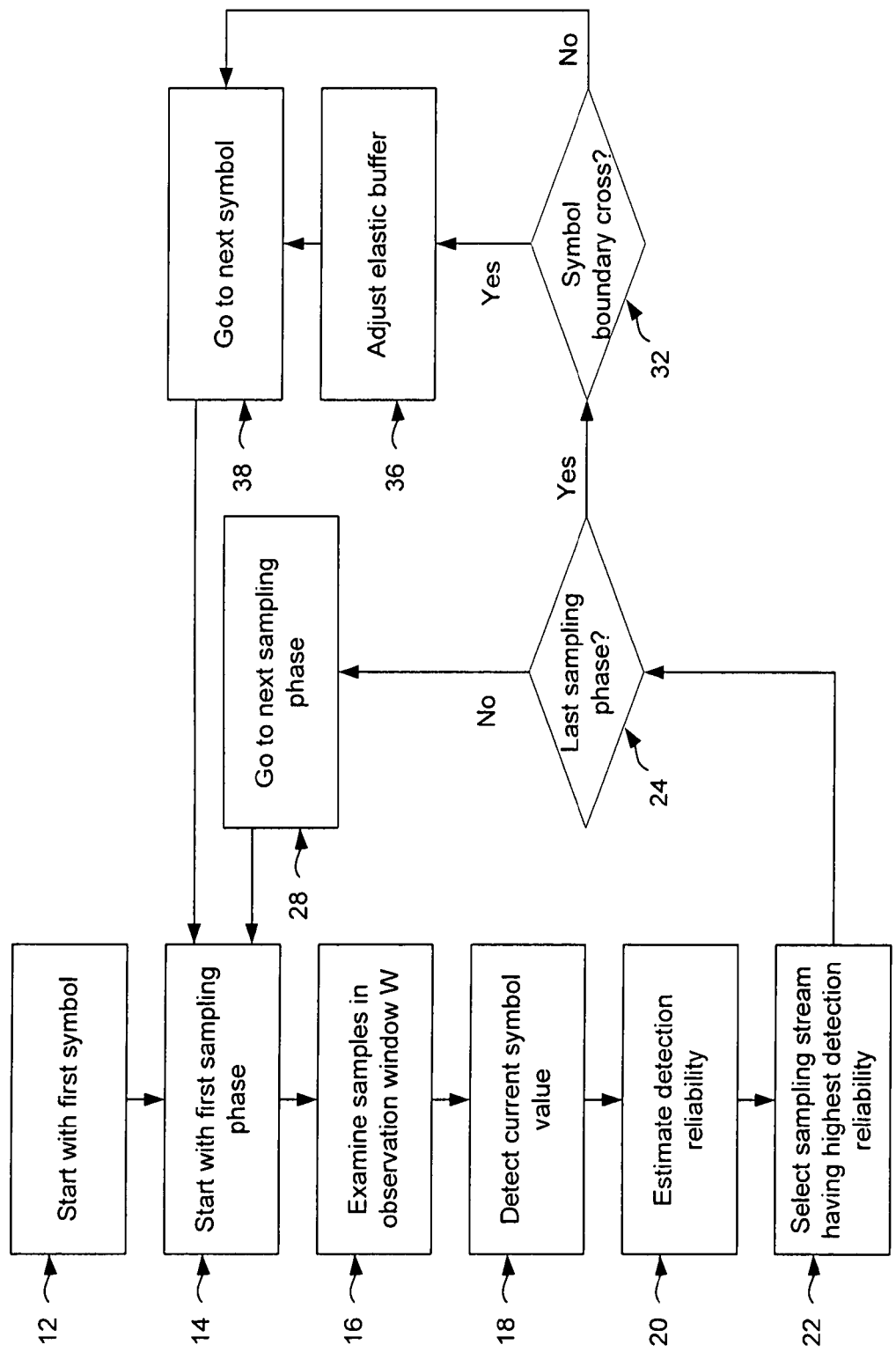
FIG. 2 is a flow chart illustrating a method for the reception of data over a digital transmission link, in accordance with an embodiment of the present invention.

FIG. 2 is a flow chart illustrating a method for the reception of data over a digital transmission link, in accordance with an embodiment of the present invention. Starting at 12 with decoding the first symbol, the method can be described in the following steps:

For each sampling phase (out of a total of L phases and starting at 14 with the first phase), at 16, examine the samples over an observation window W. This window typically includes L samples corresponding to the current symbol, as well as some samples from the previous and next symbols. For instance, for a system with an over-sampling factor of L=3, a typical observation window W may comprise 5 or 6 samples. In an example case of W=5, one look-ahead sample and one look-behind sample can be used in addition to the L=3 samples from the current symbol. In an example case of W=6, two look-behind samples and one look-ahead sample can be used in addition to the L=3 samples for the current symbol, and similarly for other values of L and W.

Next at 18, perform detection of current symbol value for each possible sampling phase using the samples selected above. Look-ahead and look-behind samples, as well as past decisions for sample streams and/or detector 100 output streams, may be used to improve the detection performance, as described below.

At 20, estimate the detection reliability for each sampling phase (i.e. assess the decision uncertainty).

At 22, select the sampling stream with the highest detection reliability (i.e. having the lowest decision uncertainty). As described below, one or more linear and/or nonlinear filters can control the selection process in order to avoid unnecessary stream switching. Alternatively, symbol-by-symbol switching without filtering can be employed if needed for a particular embodiment.

At 36, adjust 36 an Elastic Buffer if it is determined at 32 that the switching process crosses symbol boundaries. In general, a symbol boundary is crossed if the absolute value of the difference between the old and the new phase is larger than ½ UI. For example, for an over-sampling factor of L=3, such a crossing occurs when a 0↔2 or 2→0 transition has taken place. For a larger over-sampling factor such as L=5, any of the following transitions will cause symbol dropping or duplication: 0→4, 1→4, 0→3, 4→0, 4→1, and 3→0, since in all these cases the difference between the old and the new phase is 3 or 4, i.e. larger than ½ UI (which is 2.5 in this case). The Elastic Buffer is described below. Alternatively, the current symbol pointers can be adjusted for each sampling stream in order to account for boundary crossing.

At 38, repeat the above steps for the remaining symbols in the stream.

The above steps are described in more detail below.

The approach of the present invention is to assume that the sampling phase is correct and to try to guess the value of the current symbol as well as to estimate the reliability of such a guess. Quite often, every possible sampling phase will yield the same symbol value. For instance, if the symbol stream has a long run of symbols with the same value (e.g. with the value of 1) and the detector 100 is in the middle of such a run, the sampling phase is not of concern because the detected value will be 1, regardless of the phase. Furthermore, such a guess is very reliable, i.e. the uncertainty associated with such a guess is zero. Although this is a trivial example, it does illustrate the fact that the detector 100 does not always need to know the sampling phase in order to correctly detect the symbol value.

As another example sequence having phase-invariant detection results, consider the following example (in this example L=3 and W=5):
Phase 0: 000.111.101.111.000, which is decoded as 01010 (see below).
Decoded Data: --0-----0-----1----0---
Phase 1: 001.111.011.110.0, which is also decoded as 01010.
Phase 2: 011.110.111.100.0, which is decoded as 1010x (i.e. 1 symbol early).

In the above example, it was possible to make the correct detection decision regardless of the selected sampling phase, because all three streams of detected data are identical over the four symbols shown.

However, in the above example, the detection reliabilities differ for the different phases. For instance, the Phase 0 data can be decoded reliably because all symbols have a pattern of samples which could represent only one possible symbol value. All but one symbol for Phase 0 have cleanly defined symbol boundaries. The samples pattern 1.101.1 can also be decoded without ambiguity because two adjacent symbols of 1 are separated by a single 0 sample. This corresponds to a case with relatively high ISI, which causes a rather shallow zero peak, thus producing and narrow symbol. Thus, the sequence corresponding to Phase 0 is decoded reliably and has a cumulative "detection metric" of 0, indicating a low level of uncertainty. The idea is to assign decision metrics (hereinafter also referred to simply as metrics) to symbol sequences in order to indicate their level of uncertainty, and to use these decision metrics when decoding symbols from incoming samples sequences.

In contrast, the reliability of guessing the data for the Phase 1 and Phase 2 streams is lower than for the Phase 0 stream. Some samples patterns can appear confusing and ambiguous, and even if the sequence can be detected without ambiguity, the detection might be in error in the presence of severe ISI combined with phase jitter and/or frequency modulation of the data. Thus, the metrics for the Phase 1 and Phase 2 streams are set higher than for the Phase 0 stream, thereby indicating the increased uncertainty (or reduced reliability) of the detection process for the Phase 1 and Phase 2 streams. For example, both Phase 1 and Phase 2 streams can be given a metric of 2, as compared to the 0 metric of the Phase 0 stream.

By way of illustration and not limitation, the following section illustrates some example detection patterns proposed for an example implementation of the receiver.

Example Data Detection Patterns for L=3 and W=5

Among other embodiments, two embodiments of the detector 100 will be illustrated herein: one implementation which uses a previously detected value (i.e. a value decided for a previous symbol), and one implementation which does not use such a previously detected value. A scheme wherein a previous value is used to reduce uncertainty of detection of the current symbol is herein called Decision Feedback Detection, or a DF scheme. Such a scheme improves reliability of detection (i.e. reduces BER) in some cases at the expense of additional hardware.

The following table presents proposed detection patterns for a DF detector. Please note that in order to conserve space (both here and in real hardware), only the first half of the table is explicitly provided. Inverting the pattern bits as well as the detected values produces the second half. Other compression schemes may be used in order to more succinctly represent the table data.

TABLE 1

| Pattern | Previous Value | Metric | Phase | Value | Pattern numbers |
|---|---|---|---|---|---|
| 0 000 0 | 0 | 0 | 0 | 0 | 0/63 |
| 0 000 0 | 1 | 0 | 0 | 0 | 1/62 |
| 0 000 1 | 0 | 0 | 0 | 0 | 2/61 |
| 0 000 1 | 1 | 0 | 0 | 0 | 3/60 |
| 0 001 0 | 0 | 0 | −1 | 1 | 4/59 |
| 0 001 0 | 1 | 0 | −1 | 1 | 5/58 |
| 0 001 1 | 0 | 1 | 1 | 0 | 6/57 |
| 0 001 1 | 1 | 1 | 1 | 0 | 7/56 |
| 0 010 0 | 0 | 0 | 0 | 1 | 8/55 |
| 0 010 0 | 1 | 0 | 0 | 1 | 9/54 |
| 0 010 1 | 0 | 1 | 0 | 0 | 10/53 |
| 0 010 1 | 1 | 1 | 0 | 0 | 11/52 |
| 0 011 0 | 0 | 1 | −1 | 1 | 12/51 |
| 0 011 0 | 1 | 0 | 1 | 0 | 13/50 |
| 0 011 1 | 0 | 1 | −1 | 1 | 14/49 |
| 0 011 1 | 1 | 1 | 1 | 0 | 15/48 |
| 0 100 1 | 0 | 0 | 1 | 1 | 16/47 |
| 0 100 1 | 1 | 0 | 1 | 1 | 17/46 |
| 0 100 1 | 0 | 1 | 0 | 0 | 18/45 |
| 0 100 1 | 1 | 1 | 0 | 0 | 19/44 |
| 0 101 0 | 0 | 1 | 0 | 1 | 20/43 |
| 0 101 0 | 1 | 1 | 0 | 1 | 21/42 |
| 0 101 1 | 0 | 1 | 0 | 1 | 22/41 |
| 0 101 1 | 1 | 1 | 0 | 0 | 23/40 |
| 0 110 0 | 0 | 0 | 1 | 1 | 24/39 |
| 0 110 0 | 1 | 1 | 1 | 1 | 25/38 |
| 0 110 1 | 0 | 1 | 1 | 1 | 26/37 |
| 0 110 1 | 1 | 1 | −1 | 0 | 27/36 |
| 0 111 0 | 0 | 0 | 0 | 1 | 28/35 |
| 0 111 0 | 1 | 0 | 0 | 1 | 29/34 |
| 0 111 1 | 0 | 0 | 0 | 1 | 30/33 |
| 0 111 1 | 1 | 0 | 0 | 1 | 31/32 |

In Table 1, note that only the 4 patterns 0 011 0, 0 011 1, 0 101 1 and 0 110 1 (06, 07, 0B and 0D in hexadecimal notation) are dependent upon the DF value (shown in the column named "Previous Value"). Therefore, it can be concluded that a simplified non-DF detector can be implemented with a reasonable degradation of detection quality for such patterns.

Stream Selection

Once the metrics are calculated for the current symbol in each stream, the stream selection can be made. Typically, some type of filtering (such as Finite Impulse Response (FIR), Infinite Impulse Response (IIR) or nonlinear) can be used in order to maintain some desired amount of phase coherence and in order to prevent rapid switching between detection streams, since such switching can degrade detection reliability.

The detector 100 can be made more accurate if a past detection history of a specified length is taken into account before arriving at a decision to switch to another stream. This is because several independent processes such as ISI, phase jitter, frequency modulation and/or clock frequency offset, or other processes affect the symbol boundaries, as described previously. Some processes such as jitter, and to a certain extent ISI, have short phase coherence, i.e. a high rate of change on a symbol-by-symbol basis. The pattern decoder in each stream handles such short-term shifts.

Other processes, such as frequency offset or frequency modulation, generally have a much longer phase coherence period and thus are not suitable for handling by pattern detectors alone. In such a case, stream switching is performed, thus accomplishing (indirectly) a sampling phase tracking.

In one embodiment for a DVI/HDMI application, the filter can be simply implemented as a moving average taken on per-stream basis (i.e. L of 1-D filters), which is then followed by non-linear thresholding. This prevents stream switching, unless the difference between the metrics of the current stream and the candidate streams is above a specified application-dependent threshold.

In one embodiment, the candidate stream with the smallest metric is selected. However, other strategies might be used as well.

Before the symbol value is finally selected, some adjustments of candidate streams may have to be made with the help of an Elastic Buffer, as described below.

Stream Switching and the Role of the Elastic Buffer

If in the process of selection of a new candidate stream the phase difference between current and proposed streams is greater than L/2 (i.e. greater than a one-half UI phase jump), the detection process crosses the symbols boundary. Unless the detector 100 takes additional steps, erroneous detection may result because of duplication or dropping of one symbol (as determined by the phase jump direction).

For instance, when using a stream that is close to the beginning of a UI (e.g. the Phase 0 stream in a system with an over-sampling factor of L=3) and selecting a stream at the end of a UI (e.g. the Phase 2 stream in this case), the symbol boundary will be crossed and, unless necessary steps are taken, one symbol will be lost (i.e. dropped) in the detected stream.

Conversely, if the phase moves by one-half of a UI or more in a backward direction (e.g. from the Phase 2 stream to the Phase 0 stream in the above example), the symbol might be sampled twice, thus causing symbol duplication in the detected stream.

One possible solution to the above problem comprises adding an Elastic Buffer (EB) or, more generally, adding a variable symbols delay, before the stream selection is performed. In the case of a forward phase move (e.g. from the Phase 0 stream to the Phase 2 stream in the above example) the length of the Elastic Buffer (i.e. the amount of delay) is reduced by one symbol. Conversely, in the case of a phase retardment (e.g. from the Phase 2 stream to the Phase 0 stream in the above example), the length of the Elastic Buffer is increased by one symbol.

Note that an abstract Elastic Buffer (and variable delay) is used in the above discussion for the purpose of illustration the concept only and is not intended as limitation. In practical implementations, various approaches can be used. For instance, parallel implementations can be used which are based on multiplexers and common shared registers that hold several symbols worth of data. However, the following description continues to use the notion of an Elastic Buffer with the understanding that a practical receiver may use any implementation that serves to buffer and/or delay the data sufficiently.

The timing is such that the decoder calculates the metrics and makes the switch decision after the detection of the current symbol is done. At this point, optionally, the length of the Elastic Buffer is adjusted as well. However, the new candidate stream is selected during the next symbol interval. In other words, the phase switching process can be visualized as occurring in-between the symbol detections, namely after the previous symbol has been detected and before the next symbol is processed. Other implementations are possible. For instance, the switching can be done on the fly for the current symbol, without any delay. However, such an approach may increase hardware complexity without significantly improving the detection quality in many practical cases.

During an unsettled period of the receiver operation, such as at startup or when establishing a new link connection, the Elastic Buffer may reach an adjustment limit. In such a case, the buffer (i.e. the amount of delay) may have to be forcibly re-centered, resulting in possible data loss. Such re-centering prevents error propagation phenomena caused by the Elastic Buffer bouncing against the adjustment limit and causing multiple errors due to an inability to compensate for duplicated or dropped symbols in case of crossing the symbol boundary.

The re-centering process works by detecting a decrement of the Elastic Buffer length below zero (i.e. a request for a negative delay) or an increment of the Elastic Buffer length beyond the maximum length limit. In both cases, the buffer length (i.e. the delay) is set to a pre-defined value. This value may be fixed or may optionally be adaptively adjustable.

In a simple implementation with an Elastic Buffer having a length denoted $EB_{length}$, a fixed center value of $$\frac{EB_{length}}{2}$$

may be used. For example, for an $EB_{length}$ of 7 symbols, the center value can be set to 3 symbols.

Alternatively, more elaborate implementations can track the tendency of the Elastic Buffer to overflow and re-center it in order to provide more space for buffering in the direction of most likely boundary crossings. For instance, if there is a momentary positive frequency offset and the receiver sampler lags behind the phase of the incoming data, the sampling phase may likely be advanced and potentially bump against the zero delay limit. In such a case, the buffer can be re-centered to ⅔ of the maximum delay in order to decrease the probability of reaching the limit again and causing data error.

Overall Architecture

Figure 3:
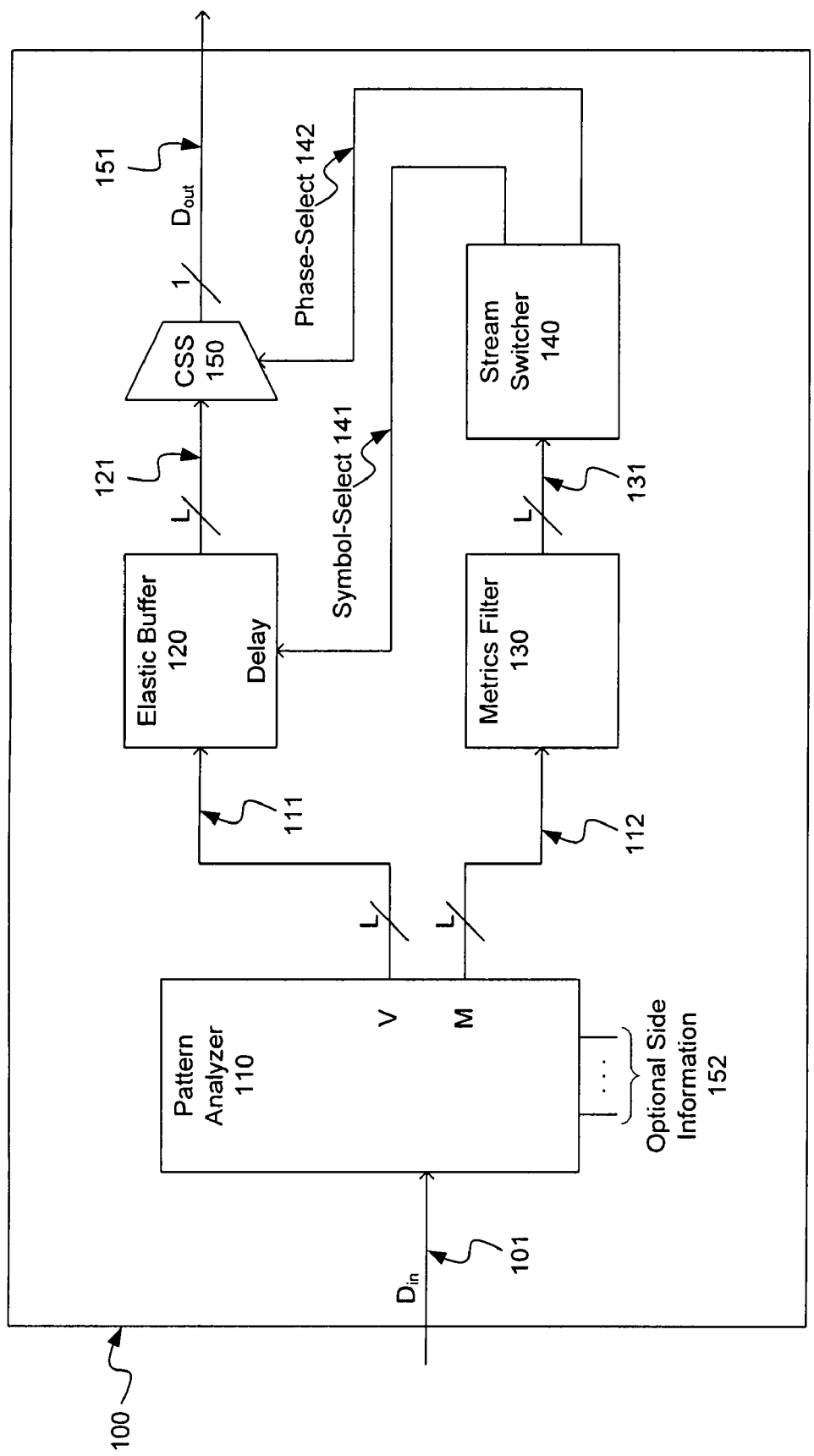
FIG. 3 is a top-level block diagram illustrating a data detector, in accordance with an embodiment of the present invention.

The architecture of an exemplary implementation of the present data detection method and system is now described. FIG. 3 is a top-level block diagram illustrating a data detector 100, in accordance with an embodiment of the present invention. Data detector 100 comprises a Pattern Analyzer 110, Metrics Filter 130, Stream Switcher 140, Elastic Buffer 120 and candidate stream selector 150.

The incoming L-times over-sampled data 101 is fed into Pattern Analyzer 110. In this block, the incoming data patterns are analyzed on a per-phase basis, and L candidate streams of values together with detection metrics are produced. In addition, this block may produce additional streams of side information 152, such as sampling phase estimations, quality of equalization measurements, etc. The present discussion is limited to value (V) streams 111 and metrics (M) streams 112.

A total of L per-phase metrics streams, hereinafter also called "raw metrics", are further processed by a Metrics Filter 130 so as to suppress short-term instabilities of the metrics values and exploit intrinsic coherence of the metrics. The detector 100 in general attempts to follow stable trends in the change of the candidate streams' quality, instead of selecting the streams on a per-symbol basis. This is because the metrics estimation may not be reliable for every symbol in the stream, and attempts to track them on a per-symbol basis (i.e. with symbol rate) may cause erroneous and/or unnecessary stream switching. The Metrics Filter 130 block accomplishes these goals and largely determines the tracking dynamics of the entire detector 100.

Once the metrics streams have been filtered (hereinafter also referred to as "cooked" metrics), the L cooked metrics 131 are sent to Stream Switcher block 140 which decides which stream to select. Stream Switcher block 140 also controls the length of the Elastic Buffer 120 in order to adjust the buffering delay in the case of symbol boundary crossing. The candidate stream selection data is sent by the "Phase-Select" signal 142 and the Elastic Buffer 120 delay value is sent by the "Symbol-Select" signal 141.

The Elastic Buffer block 120 delays candidate streams by the amount specified by the Stream Switcher 140. The L candidate streams are delayed by the same number of symbol intervals. In a practical hardware implementation, the Elastic Buffer block 120 can be implemented as a multi-tapped shift register shared between the candidate streams and an array of multiplexers for selecting the appropriate tap. Other implementations are possible as well, such as a shift register of variable length for each stream.

The delayed candidate streams are applied to Candidate Stream Selector (CSS) 150, which retains one of the L streams and discards the remaining data. The retained stream represents the output data stream 151 of the detector 100. An important and advantageous aspect of the present invention is the lack of feedback loops in the overall detector 100 topology. This facilitates highly parallel detector 100 implementations and makes the technology suitable for very high-speed operation, such as Gigabit/second data rates and higher.

Pattern Analyzer

Figure 4:
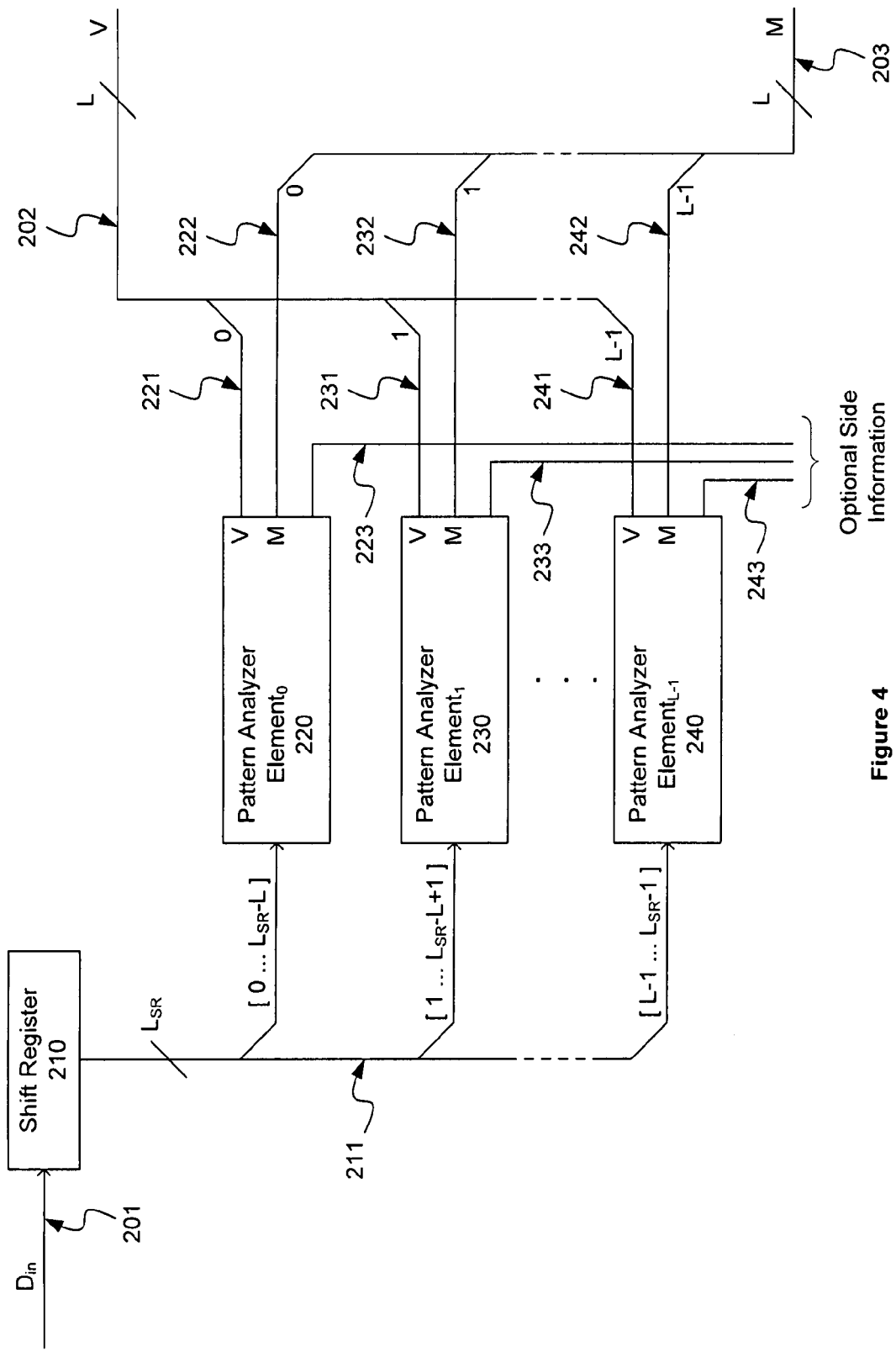
FIG. 4 is a block diagram illustrating the Pattern Analyzer, in accordance with an embodiment of the present invention.

FIG. 4 is a block diagram illustrating the Pattern Analyzer 110, in accordance with an embodiment of the present invention. The incoming data samples 201 are sent into Shift Register 210 having a specified delay. The Shift Register 210 is long enough to hold $L_{SR}$ samples, wherein:

$$L_{SR}=2L+N_{LB}+N_{LA}-1$$

and wherein L is the over-sampling factor, $N_{LA}$ is the number of Look Ahead (LA) samples required for pattern analysis, $N_{LB}$ is the number of Look Behind (LB) samples, and $L_{SR}$ is the minimum length (in samples) of the Shift Register 210.

For instance, in the example case of 3× over-sampling and 5 samples pattern analysis (i.e. one LA and one LB sample, not including decision feedback (DF) samples), the Shift Register 210 produces 7 samples in parallel. However, while this particular exemplary embodiment using Shift Register 210 makes the operation easier to understand, other implementations are possible. For example, parallel registers with multiplexers can be used to facilitate parallel processing of data (which might be necessary at high data rates), and to reduce complexity and/or power consumption.

From the Shift Register 210, the samples 211 are sent to an array of Pattern Analyzer Elements 220, 230 . . . 240. For purposes of clarity, only the first two and the last Pattern Analyzer Elements are shown in FIG. 4. Each Pattern Analyzer Element 220 . . . 240 observes the appropriate collection of samples presented to it on a per-symbol basis, and estimates the most likely detection value as well as estimation metrics and other side information (as required). As a result, L pairs of candidate values and their metrics are sent out on lines 202 and 203, respectively.

Pattern Analyzer Elements

Figure 5:
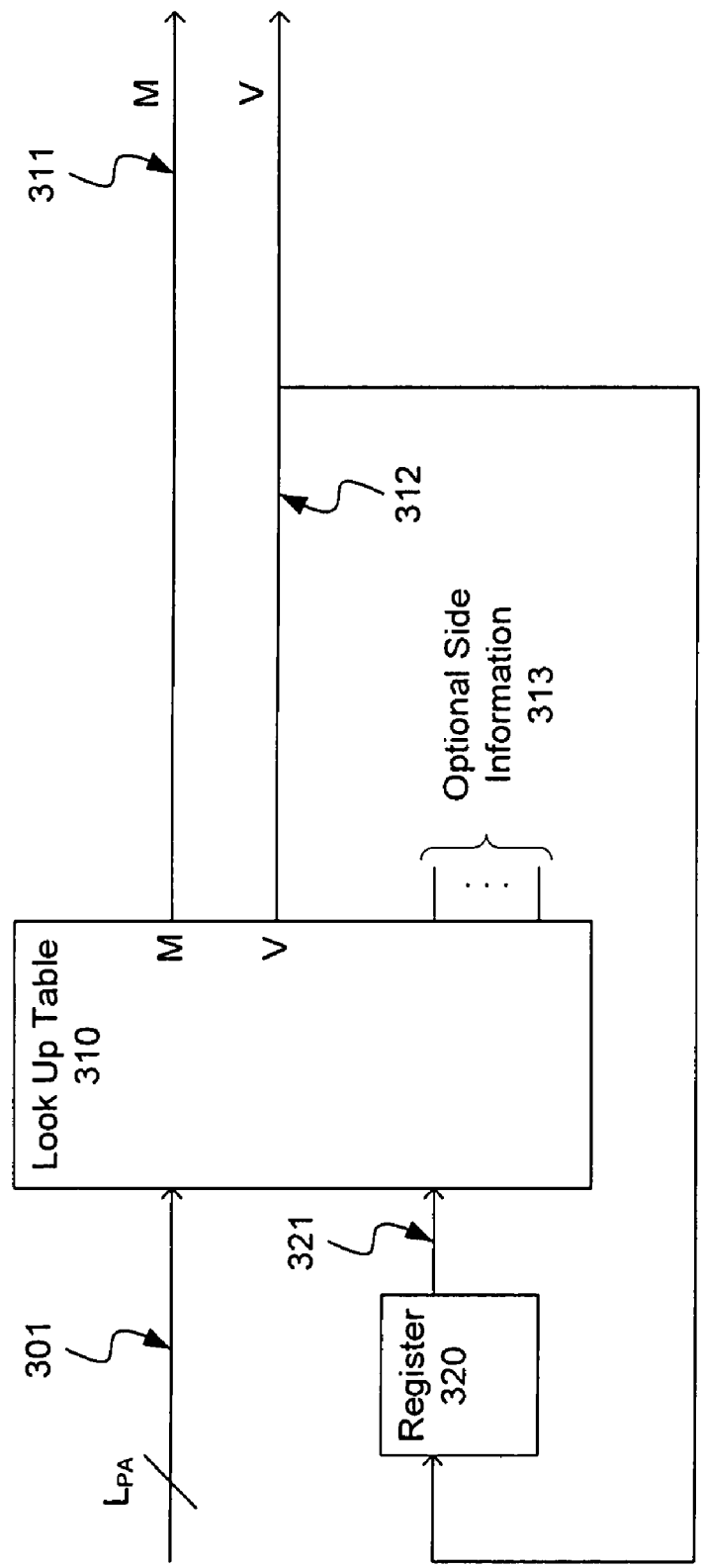
FIG. 5 is a block diagram illustrating a Pattern Analyzer Element, in accordance with one embodiment of the present invention.

FIG. 5 is a block diagram illustrating a Pattern Analyzer Element, in accordance with one embodiment of the present invention. An incoming collection of a total of $L_{PA}=N_{LB}+L+N_{LA}$ samples are received from the Pattern Analyzer 110 on line 301 and applied as an input to Look Up Table (LUT) 310. In addition, the previously decided upon value 321 is received from a Register 320. The Register 320 is updated on a per-symbol basis, i.e. once per detector cycle.

The Look Up Table 310 produces a value "V" 312, a metric "M" 331, as well as additional side information 313 about phase, equalization, etc. The Look Up Table 310 can be implemented using a Read Only Memory (ROM) or using random logic. The candidate value "V" 312 is stored in Register 320, to be used during the processing of the next symbol.

Elastic Buffer

Figure 6:
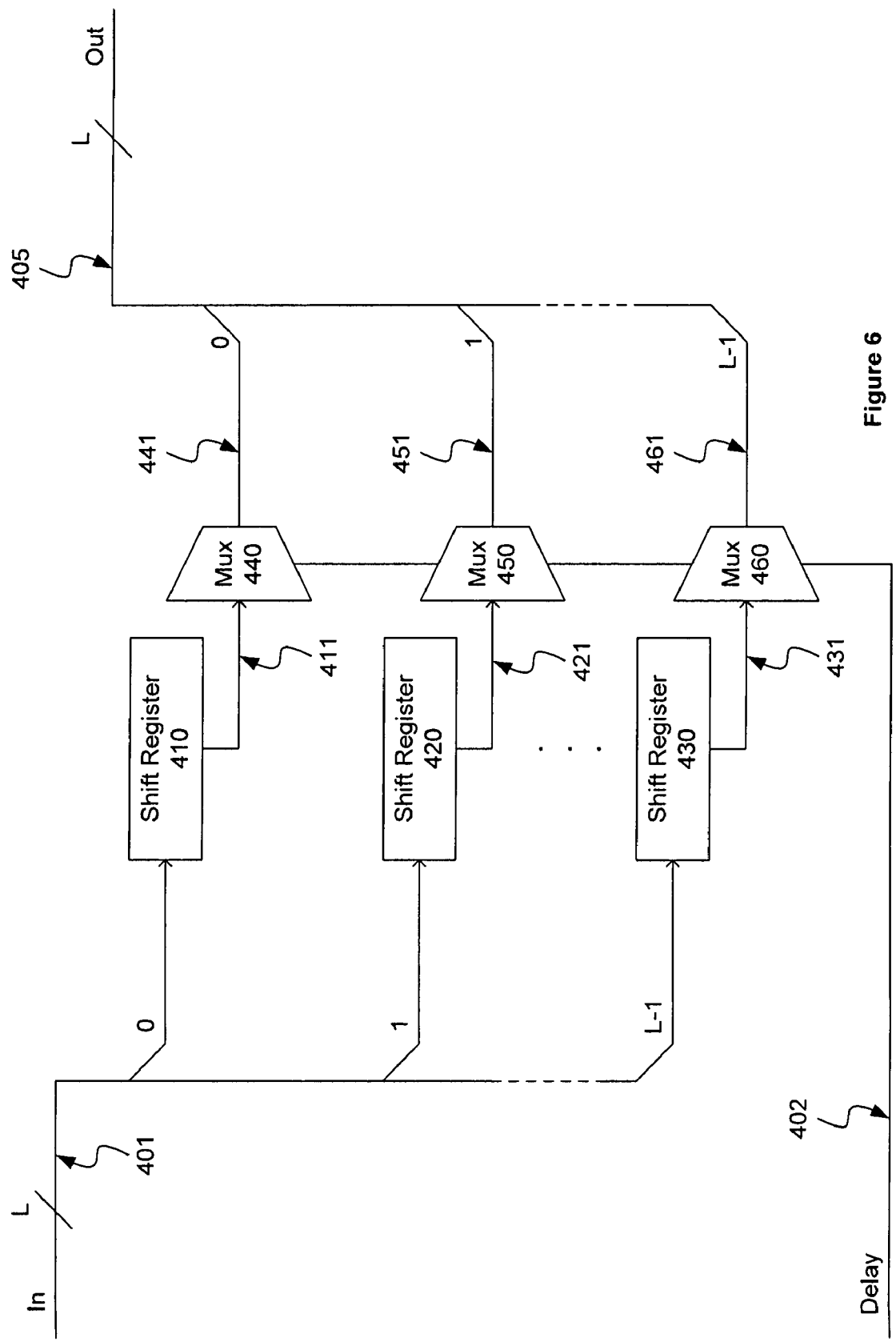
FIG. 6 is a block diagram illustrating the Elastic Buffer, in accordance with one embodiment of the present invention.

FIG. 6 is a block diagram illustrating the Elastic Buffer 120, in accordance with one embodiment of the present invention. A total of L candidate streams are received on line 401 and shifted into an array of L Shift Registers 410, 420 . . . 430, on a per-symbol basis. Under the control of delay signal 402, the appropriate tap of each Shift Register 410, 420 . . . 430 is selected by a corresponding total of L multiplexers 440, 450 . . . 460. The outputs 441, 451 . . . 461 of the multiplexers 440, 450 . . . 460 comprise a collection of L candidate streams, appropriately delayed and sent out via signal 405. Other implementations of the Elastic Buffer 120 are possible, such as a parallel load register shared between the L streams using appropriate multiplexers, or other such implementations.

Stream Switcher

Figure 7:
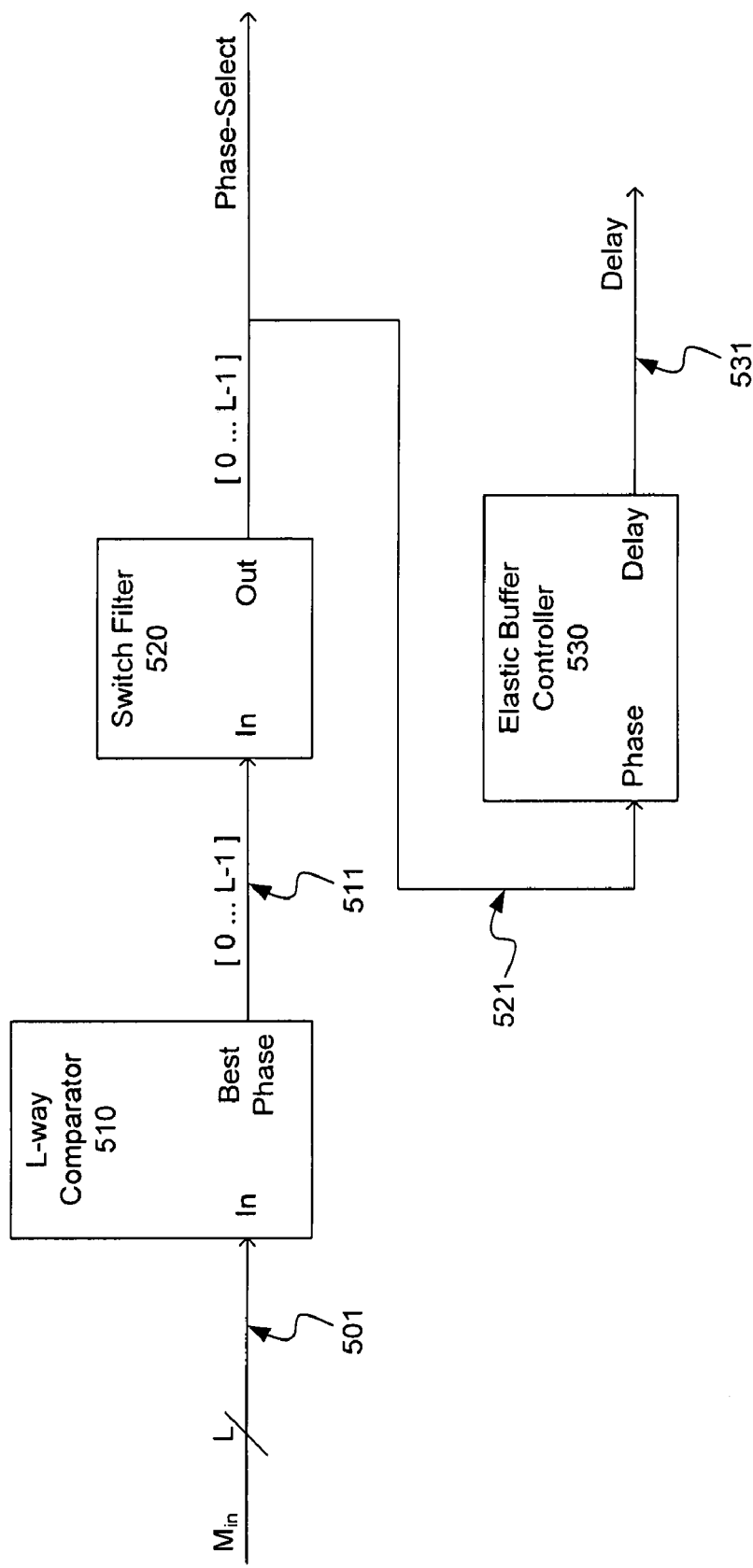
FIG. 7 is a block diagram illustrating the Stream Switcher, in accordance with one embodiment of the present invention.

FIG. 7 is a block diagram illustrating the Stream Switcher 140, in accordance with one embodiment of the present invention. Appropriately filtered (cooked) metrics $M_{in}$ are received from Metrics Filter 130 on line 501. The cooked metrics are sent to an L-way Comparator 510 which compares the incoming metrics on a per-symbol basis and determines which one of the L candidate streams currently has the highest likelihood of being correct. In the present embodiment, the lower the metric, the higher the probability that the decision is correct regarding the candidate value. Thus, in such a case, the Comparator 510 may determine the stream that has the lowest cooked metric. The number of such a stream is sent to Switch Filter 520 on line 511.

The Switch Filter (SF) 520 performs linear and/or non-linear filtering so as to avoid switching the candidate streams for small short-term changes in the metrics. This generally improves system operation. The filtering algorithm is dependent on the operational environment. Simple non-linear schemes such as fixed or adaptive thresholding work well in many cases (such as DVI/HDMI implementations). For example, stream switching can be done only when the difference in metrics between the currently used stream and the proposed stream is bigger than a specified implementation-dependent value.

The currently determined candidate stream selector "Phase-Select" is then sent out to the Candidate Stream Selector block 150 on line 521. In addition, the Phase-Select signal is also sent to the Elastic Buffer Controller (EBC) 530. The Elastic Buffer Controller 530 observes the changes in the selected candidate stream and adjusts the Elastic Buffer delay if the selection crosses the symbol boundary in any direction. The current amount of necessary delay is sent out to the Elastic Buffer 120 on line 531.

Elastic Buffer Controller

Figure 8:
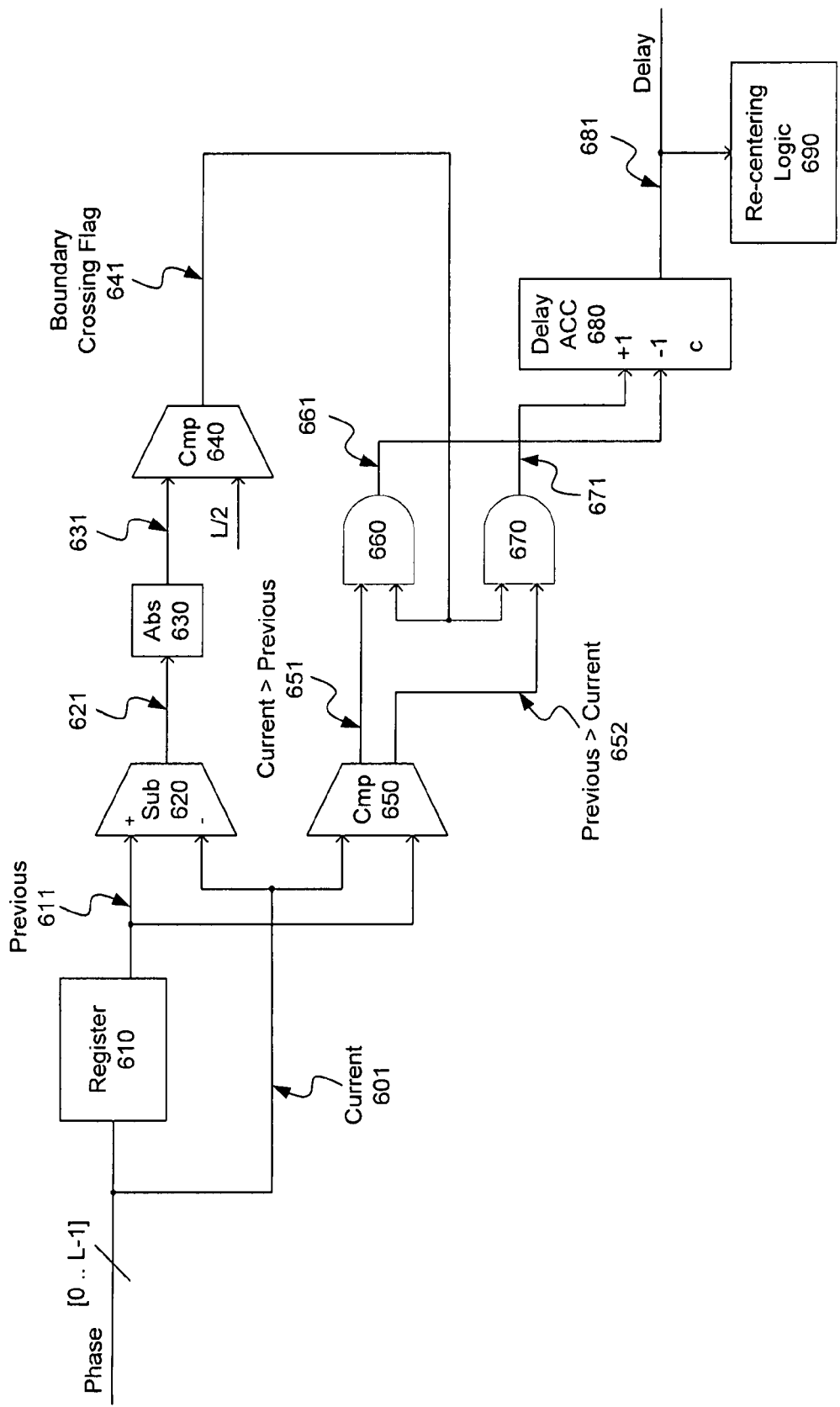
FIG. 8 is a block diagram illustrating the Elastic Buffer Controller, in accordance with one embodiment of the present invention.

FIG. 8 is a block diagram illustrating the Elastic Buffer Controller 530, in accordance with one embodiment of the present invention. The proposed candidate stream number "Phase" 601 is received from Switch Filter 520 and is delayed in Register 610 by one symbol, and the difference between current and previous stream numbers is determined by Subtractor circuit 620 and Absolute Value circuit 630.

The absolute value of the selector difference is the sent on line 631 to two-way Comparator 640, which determines whether the difference is greater than L/2, i.e. larger than one-half of a symbol interval. If so, the boundary crossing condition is flagged on line 641, enabling the adjustment of the value in Delay Accumulator 680 with the help of AND-gates 660 and 670.

The direction of the delay adjustment is determined by two-way Comparator 650, which determines whether the sampling is leading or lagging the input data. In the case of a boundary crossing, the Delay Accumulator 680 value is incremented or decremented, according to the results of the comparison done by Comparator 650. Re-centering Logic 690 checks for out-of-range delay values and resets the value of the Delay Accumulator 680 in such cases. See above for a discussion of the re-centering process.

Figure 9:
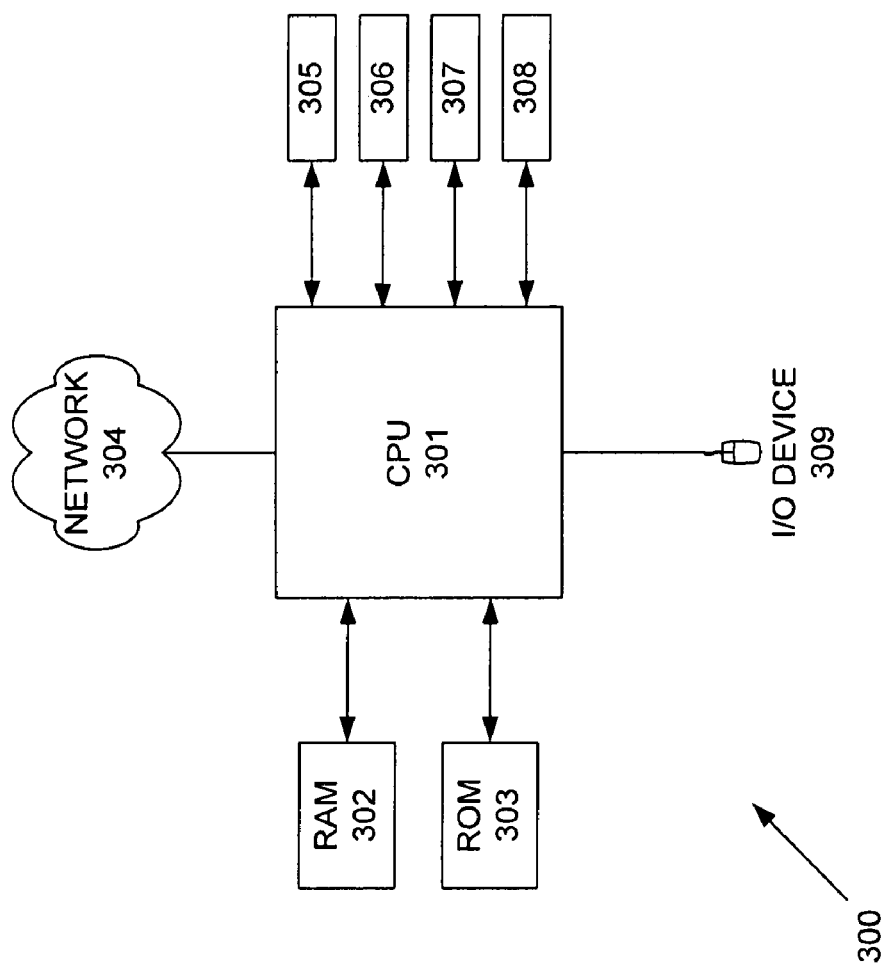
FIG. 9 is a block diagram illustrating an exemplary computer system employed to implement an embodiment of the invention.

FIG. 9 illustrates an exemplary computer system 300 employed to implement an embodiment of the invention. Computer system 300 includes one or more central processing units (CPU) 301, random access memory (RAM) 302, read only memory (ROM) 303, one or more peripherals 305, and primary storage devices 306 and 307. As is well known in the art, ROM acts to transfer data and instructions uni-directionally to the CPUs 301, while RAM is used typically to transfer data and instructions in a bi-directional manner. CPUs 301 may generally include any number of processors. Both primary storage devices 306 and 307 may include any suitable computer-readable media. A secondary storage medium 308, which is typically a mass memory device, is also coupled bi-directionally to CPUs 301 and provides additional data storage capacity. The mass memory device 308 is a computer-readable medium that may be used to store programs including computer code, data, and the like. Typically, mass memory device 308 is a storage medium such as a hard disk or a tape which generally slower than primary storage devices 306 and 307. Mass memory storage device 308 may take the form of a magnetic or paper tape reader or some other well-known device. It will be appreciated that the information retained within the mass memory device 308 may, in appropriate cases, be incorporated in standard fashion as part of RAM 302 as virtual memory.

CPUs 301 are also coupled to one or more input/output devices 309 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 301 are coupled to a communication link or a computer or telecommunications network 304, such as a digital transmission link, an Internet network or an intranet network, using a network connection as shown generally at 304. With such a communication link, it is contemplated that the CPUs 301 might receive information over the link from the network, or might output information over the link to the network in the course of performing the above-described over-sampled data reception and/or transmission steps. The above-described devices and materials will be familiar to those of skill in the computer hardware and software arts. Computer system 300 receives one or more over-sampled data streams and processes them in order to decode transmitted symbols and perform reception, detection and/or other processing steps described above. Computer instructions for performing such reception, detection and/or other processing steps may be stored in the RAM 302, ROM 303, primary storage devices 306 and 307, and/or any other computer-readable media.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by Claims following.

We claim:

1. A method for ensuring the signal integrity of data transmitted over a digital transmission link and received at a receiver unit, comprising:

representing an encoded symbol stream by a plurality of sample streams;

detecting a symbol from each of the plurality of sample streams;

delaying each of the detected symbols from the plurality of sample streams with a variable delay buffer;

determining which one of the detected symbols detected from each of the plurality of sample streams is a current most reliable symbol;

selecting the current most reliable symbol;

determining if the selected current most reliable symbol will result in skipping or repeating an associated symbol from the encoded symbol stream, and if so, adjusting a delay length of the variable delay buffer such that the associated symbol from the encoded symbol stream will not be skipped or repeated, and if not, not adjusting the delay length of the variable delay buffer; and receiving the selected symbol at the receiver unit.

2. A method as recited in claim 1, wherein the selected current most reliable symbol is used to represent an associated symbol from the symbol stream.

3. A method as recited in claim 2, wherein selecting the current most reliable symbol comprises selecting a one of the plurality of sample streams having the current most reliable symbol.

4. A method as recited in claim 1, wherein determining if the selected current most reliable symbol will result in skipping or repeating an associated symbol from the encoded symbol stream is based on a difference in phase between the sample stream having the current most reliable symbol and the sample stream from which a previous most reliable symbol was selected.

5. A method as recited in claim 4, wherein if the difference in phase is greater than a first threshold, the delay length of the variable delay buffer is decreased, and wherein if the difference in phase is less than a second threshold, the delay length of the variable length buffer is increased.

6. A method as recited in claim 5, wherein the plurality of sample streams are generated by oversampling the encoded symbol stream by an oversampling factor of L to produce L sample streams and wherein L is an integer.

7. A method as recited in claim 6, wherein the first threshold is represented by a positive phase value related to half the oversampling factor L and the second threshold is represented by a negative phase value related to half the oversampling factor L, wherein if the difference in phase is greater than the positive phase value, the delay length of the variable delay buffer is decreased by one symbol length and wherein if the difference in phase is less than the negative phase value, the delay length of the variable length buffer is increased by one symbol length.

8. An apparatus for ensuring the signal integrity of data transmitted over a digital transmission link and received at a receiver unit, comprising:
a data sampler for representing an encoded symbol stream by a plurality of sample streams;
a pattern analyzer for detecting a symbol from each of the plurality of sample streams and determining which one of the detected symbols detected from each of the plurality of sample streams is a current most reliable symbol;
a variable delay buffer for delaying the detected symbols from each of the plurality of sample streams; and
a stream switcher for selecting the current most reliable symbol and determining if the selected current most reliable symbol will result in skipping or repeating an associated symbol from the encoded symbol stream, and if so, adjusting a delay length of the variable delay buffer such that the associated symbol from the encoded symbol stream will not be skipped or repeated, and if not, not adjusting the delay length of variable delay buffer.

9. An apparatus as recited in claim 8, wherein the selected current most reliable symbol is used to represent an associated symbol from the symbol stream.

10. An apparatus as recited in claim 9, wherein selecting the current most reliable symbol comprises selecting a one of the plurality of sample streams having the current most reliable symbol.

11. An apparatus as recited in claim 8, wherein determining if the selected current most reliable symbol will result in skipping or repeating an associated symbol from the encoded symbol stream is based on a difference in phase between the sample stream having the current most reliable symbol and the sample stream from which a previous most reliable symbol was selected.

12. An apparatus as recited in claim 11, wherein if the difference in phase is greater than a first threshold, the delay length of the variable delay buffer is decreased, and wherein if the difference in phase is less than a second threshold, the delay length of the variable length buffer is increased.

13. An apparatus as recited in claim 12, wherein the plurality of sample streams are generated by oversampling the encoded symbol stream by an oversampling factor of L to produce L sample streams and wherein L is an integer.

14. An apparatus as recited in claim 13, wherein the first threshold is represented by a positive phase value related to half the oversampling factor L and the second threshold is represented by a negative phase value related to half the oversampling factor L, wherein if the difference in phase is greater than the positive phase value, the delay length of the variable delay buffer is decreased by one symbol length and wherein if the difference in phase is less than the negative phase value, the delay length of the variable length buffer is increased by one symbol length.

15. A computer-readable medium having computer-executable instructions recorded thereon for, when executed by a processor of a computer system, enabling a the processor of the computer system to ensure the signal integrity of data transmitted over a digital transmission link and received at a receiver unit by performing the steps of:
representing an encoded symbol stream by a plurality of sample streams;
detecting a symbol from each of the plurality of sample streams;
delaying each of the detected symbols from the plurality of sample streams with a variable delay buffer;
determining which one of the detected symbols detected from each of the plurality of sample streams is a current most reliable symbol;
selecting the current most reliable symbol;
determining if the selected current most reliable symbol will result in skipping or repeating an associated symbol from the encoded symbol stream, and if so, adjusting a delay length of the variable delay buffer such that the associated symbol from the encoded symbol stream will not be skipped or repeated, and if not, not adjusting the delay length of variable delay buffer; and
receiving the selected symbol at the receiver unit.

16. A computer-readable medium as recited in claim 15, wherein the selected current most reliable symbol is used to represent an associated symbol from the symbol stream.

17. A computer-readable medium as recited in claim 16, wherein selecting the current most reliable symbol comprises selecting a one of the plurality of sample streams having the current most reliable symbol.

18. A computer-readable medium as recited in claim 15, wherein determining if the selected current most reliable symbol will result in skipping or repeating an associated symbol from the encoded symbol stream is based on a difference in phase between the sample stream having the current most reliable symbol and the sample stream from which a previous most reliable symbol was selected.

19. A computer-readable medium as recited in claim 18, wherein if the difference in phase is greater than a first threshold, the delay length of the variable delay buffer is decreased, and wherein if the difference in phase is less than a second threshold, the delay length of the variable length buffer is increased.

20. A computer-readable medium as recited in claim 19, wherein the plurality of sample streams are generated by oversampling the encoded symbol stream by an oversampling factor of L to produce L sample streams and wherein L is an integer.

21. A computer-readable medium as recited in claim 20, wherein the first threshold is represented by a positive phase value related to half the oversampling factor L and the second threshold is represented by a negative phase value related to half the oversampling factor L, wherein if the difference in phase is greater than the positive phase value, the delay length of the variable delay buffer is decreased by one symbol length and wherein if the difference in phase is less than the negative phase value, the delay length of the variable length buffer is increased by one symbol length.

* * * * *

UNITED STATES PATENT AND TRADEMARK OFFICE
CERTIFICATE OF CORRECTION

PATENT NO.        : 7,412,017 B2
APPLICATION NO.   : 11/931962
DATED             : August 12, 2008
INVENTOR(S)       : A. J. Eglit It is certified that error appears in the above-identified patent and that said Letters Patent is hereby corrected as shown below:

| COLUMN | LINE | ERROR |
| --- | --- | --- |
| 16 (Claim 15, line 3) | 1 | "enabling a the processor" should read --enabling the processor-- |

Signed and Sealed this

Fifteenth Day of June, 2010

David J. Kappos
*Director of the United States Patent and Trademark Office*